United States Patent [19]
Essinger, Jr.

[11] Patent Number: 4,710,559
[45] Date of Patent: Dec. 1, 1987

[54] HEAT CURABLE ORGANOPOLYSILOXANE COMPOSITIONS

[75] Inventor: James F. Essinger, Jr., Adrian, Mich.

[73] Assignee: Wacker Silicones Corporation, Adrian, Mich.

[21] Appl. No.: 945,132

[22] Filed: Dec. 22, 1986

[51] Int. Cl.$^4$ ............................................. C08G 77/06
[52] U.S. Cl. .................................... 528/15; 528/31; 528/32; 525/478
[58] Field of Search ............................ 528/15, 31, 32; 525/478

[56] References Cited

U.S. PATENT DOCUMENTS 4,035,453 7/1977 Hittmair et al. ..................... 528/15
4,043,977 8/1977 de Montigny et al. ............... 528/15
4,465,818 8/1984 Shirahata et al. .................... 528/15
4,472,563 9/1984 Chandra et al. ..................... 528/15
4,595,739 6/1986 Cavezzan ............................ 528/15

Primary Examiner—Melvyn I. Marquis

[57] ABSTRACT

Heat curable organopolysiloxane compositions comprising an organopolysiloxane having Si-bonded aliphatically unsaturated groups, an organohydrogenpolysiloxane having Si-bonded hydrogen atoms, a platinum catalyst capable of promoting the addition of Si-bonded hydrogen to Si-bonded aliphatically unsaturated groups and a hydrazone compound. The resultant composition is stable at room temperature, but when heated to an elevated temperature cures to an elastomer.

17 Claims, No Drawings

HEAT CURABLE ORGANOPOLYSILOXANE COMPOSITIONS

The present invention relates to heat curable organopolysiloxanes and more particularly, the invention relates to heat curable organopolysiloxane compositions which have improved storage stability.

BACKGROUND OF THE INVENTION

It is generally known that platinum catalysts will accelerate the addition of compounds containing silicon-bonded hydrogen atoms to compounds containing aliphatic unsaturation. Oftentimes, it is desirable to mix the platinum catalysts with the compounds containing silicon-bonded hydrogen atoms and the compounds containing aliphatic unsaturation and carry out the addition reaction at some future time. Unfortunately, such mixtures of silicone compounds and platinum catalysts do not have sufficient shelf life or stability to remain unchanged at ambient temperature (20° to 30°) for sufficient periods of time to permit their use in some applications.

Organopolysiloxane compositions which contain compounds that inhibit crosslinking are described in, for example, U.S. Pat. No. 3,192,181 to Moore, in which the composition contains an organosilicon compound having an average of at least two monovalent radicals containing aliphatic unsaturation per molecule, an organosilicon compound having an average of at least two silicon-bonded hydrogen atoms per molecule, a platinum catalyst and benzotriazole as an inhibitor.

Heat curable organopolysiloxane compositions are described in U.S. Pat. No. 3,992,355 to Itoh et al in which the compositions contain a diorganopolysiloxane having an average of at least two vinyl groups per molecule, an organohydrogenpolysiloxane having at least two SiH groups per molecule, a platinum catalyst and a hydrazine compound to inhibit crosslinking.

It is, therefore, an object of the present invention to provide an organopolysiloxane composition having improved storage stability. Another object of the present invention is to provide an organopolysiloxane composition having improved "working times". Still another object of the present invention is to provide an organopolysiloxane composition having improved cure rates at elevated temperatures. Still another object of the present invention is to provide an inhibited catalyst for the hydrosilation of vinyl siloxanes. A still further object of the present invention is to provide a heat-curable organopolysiloxane composition having improved storage stability and "pot-life".

SUMMARY OF THE INVENTION

The foregoing objects and others which will become apparent from the following description are accomplished in accordance with this invention, generally speaking, by providing a heat curable organopolysiloxane composition comprising (a) an organopolysiloxane having an average of at least two aliphatically unsaturated monovalent hydrocarbon radicals;

(b) an organohydrogenpolysiloxane having at least two silicon-bonded hydrogen atoms per molecule;

(c) a platinum catalyst which is capable of promoting the addition of silicon-bonded hydrogen to the aliphatically unsaturated monovalent hydrocarbon radicals; and (d) a hydrazone compound.

The resultant composition is stable at room temperature, but when heated to an elevated temperature forms an elastomer having desirable physical properties.

DESCRIPTION OF THE INVENTION

The organopolysiloxanes employed in the compositions of this invention generally have recurring units of the formula

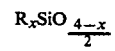

where R is selected from the group consisting of monovalent hydrocarbon radicals and halogenated monovalent hydrocarbon radicals in which an average of at least two of the monovalent hydrocarbon radicals contain aliphatically unsaturated groups per molecule and x is an integer of from 1 to 3, with an average value of from about 1.7 to about 2.1.

It is preferred that the hydrocarbon radicals and substituted hydrocarbon radicals represented by R each contain from 1 to 18 carbon atoms. Examples of suitable hydrocarbon radicals are alkyl radicals, such as the methyl, ethyl, n-propyl and isopropyl radicals, as well as the octadecyl radicals; cycloalkyl radicals such as the cyclohexyl and the cycloheptyl radicals; aryl radicals such as the phenyl radical; alkaryl radicals such as the tolyl radicals and aralkyl radicals such as the benzyl and the beta-phenylethyl radicals. Examples of substituted hydrocarbon radicals represented by R are halogenated hydrocarbon radicals, such as the 3,3,3-trifluoropropyl radical and o-, m- and p-chlorophenyl radicals. Because of their availability, it is preferred that at least 80 percent of the R radicals be methyl radicals.

Examples of hydrocarbon radicals having aliphatic unsaturation are vinyl, allyl, methallyl and butadienyl radicals, with vinyl being the preferred radical.

These organopolysiloxanes preferably have a viscosity of from about 5 to 10,000,000 mPa.s at 25° C. and more preferably from about 40 to about 500,000 mPa.s at 25° C.

The organopolysiloxanes employed in the compositions of this invention are produced by the hydrolysis and condensation of the corresponding hydrolyzable silanes. These organopolysiloxanes are preferably linear polymers containing diorganosiloxane units of the formula $R_2SiO$; however, these polymers may also contain minor amounts of other units, such as $RSiO_{3/2}$ units, $R_3SiO_{0.5}$ and/or $SiO_{4/2}$ units, in which R is the same as above.

The preferred organopolysiloxane is a diorganopolysiloxane having the general formula

where n is a number such that the organopolysiloxane has a viscosity of from about 40 to 100,000 mPa.s at 25° C.

The organohydrogenpolysiloxanes employed in the compositions of this invention generally consist of units of the general formula

where R' represents hydrogen, a monovalent hydrocarbon radical or a halogenated monovalent hydrocarbon radical having from 1 to 18 carbon atoms, in which at least two and preferably three Si-bonded hydrogen atoms are present per molecule and m is 1, 2 or 3. Preferred compounds are those consisting of RSiO-units, $R_2SiO$- and $R_3SiO_{0.5}$- units, in which an Si-bonded hydrogen atom is present for each 3 to 100 silicon atoms and R is the same as above. It is preferred that the organohydrogenpolysiloxanes have a viscosity of from about 10 to 50,000 mPa.s and more preferably from 100 to 20,000 mPa.s at 25° C.

The organohydrogenpolysiloxanes may also contain monovalent hydrocarbon radicals having aliphatic unsaturation as well as Si-bonded hydrogen atoms in the same molecule.

It is preferred that the organohydrogenpolysiloxanes contain from 0.002 to about 1.7 percent by weight of Si-bonded hydrogen atoms, and the silicon valences not satisfied by hydrogen atoms or siloxane oxygen atoms are satisfied by unsubstituted or substituted monovalent hydrocarbon radicals free of aliphatic unsaturation.

The organohydrogenpolysiloxanes having an average of at least 2 Si-bonded hydrogen atoms per molecule are preferably present in the compositions of this invention in an amount of from about 0.1 to about 15 Si-bonded hydrogen atoms per aliphatically unsaturated group.

The platinum catalyst employed in this invention may consist of finely dispersed platinum as well as platinum compounds and/or platinum complexes which have been used heretofore to promote the addition of Si-bonded hydrogen atoms to compounds having aliphatically unsaturated groups.

Examples of catalysts which can be used in this invention are finely dispersed platinum on carriers, such as silicon dioxide, aluminum oxide or activated charcoal, platinum halides, such as $PtCl_4$, chloroplatinic acid and $Na_2PtCl_4.nH_2O$, platinum-olefin complexes, for example, those with ethylene, propylene or butadiene, platinum-alcohol complexes, platinum-styrene complexes such as those described in U.S. Pat. No. 4,394,317 to McAfee et al, platinum-alcoholate complexes, platinum-acetylacetonate, reaction products comprising chloroplatinic acid and monoketones, for example, cyclohexanone, methyl ethyl ketone, acetone, methyl-n-propyl ketone, diisobutyl ketone, acetophenone and mesityl oxide, as well as platinum-vinylsiloxane complexes, such as platinum-divinyltetramethyldisiloxane complexes with or without a detectable amount of inorganic halogen. The platinum-vinylsiloxane complexes are described, for example, in U.S. Pat. Nos. 3,715,334; 3,775,452; and 3,814,730 to Karstedt.

Mixtures of various platinum catalysts, for example, a mixture consisting of the reaction product of chloroplatinic acid and cyclohexanone and a platinum-divinyltetramethyldisiloxane complex which is free of detectable inorganic halogen may be used in the compositions of this invention.

The platinum catalyst is generally employed in an amount of from about 0.5 to 300 ppm by weight and more preferably from about 2 to 50 ppm by weight calculated as platinum and based on the weight of the silicon compounds.

Hydrazone compounds which may be employed in the compositions of this invention are those with the general formula

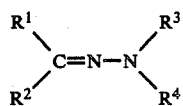

in which $R^1$, $R^2$, $R^3$ and $R^4$ is hydrogen, or a monovalent hydrocarbon radical having up to 6 carbon atoms with the proviso that $R^1$ or $R^2$ must be an alkyl or aryl radical.

Examples of monovalent hydrocarbon radicals represented by $R^1$, $R^2$, $R^3$ and $R^4$ are alkyl radicals such as methyl, ethyl, propyl, butyl and hexyl radicals and aryl radicals such as the phenyl radical.

Examples of hydrazone compounds are acetone hydrazone, acetaldehyde hydrazone, benzaldehyde phenylpropylhydrazone, acetaldehyde phenylhydrazone, acetone phenylhydrazone, methyl ethyl carbyl phenylhydrazone, methyl butyl carbyl methylhydrazone and diethyl carbyl phenylhydrazone.

The amount of hydrazone compound which may be employed in the compositions of this invention may vary over a wide range. For example, the amount of hydrazone compound may vary from about 1 to 150 moles of hydrazone compound per mole of platinum, and more preferably from about 3 to 100 moles of hydrazone compound per mole of platinum.

Fillers which may be incorporated in the compositions of this invention are reinforcing fillers, i.e., fillers having a surface area of at least 50 m²/gm Examples of such fillers are precipitated silicon dioxide having a surface area of at least 50 m²/gm and/or pyrogenically produced silicon dioxide. Examples of other reinforcing fillers are the aerogels, alumina, carbon blacks and graphite.

A portion of the fillers can be semi- or non-reinforcing fillers, i.e., fillers which have a surface area of less than 50 m²/gm. Examples of semi- or non-reinforcing fillers are metal oxides, metal nitrides, cork, organic resins, polytetrafluoroethylene, polychlorotrifluoroethylene, polyvinyl chloride, carbon black, graphite, bentonite, diatomaceous earth, crushed quartz, mica, metal fibers, glass beads, bubbles or fibers and mixtures thereof. Preferred examples of metal oxides are zinc oxide, ferric oxide, alumina and titanium oxide. The fillers may also be treated with, for example, triorganoalkoxysilanes, such as trimethylethoxysilane to coat the surfaces with organosiloxy groups.

The amount of fillers which may be incorporated in the compositions of this invention is not critical and may vary over a wide range. Thus, the amount of filler may range from about 1 to 80 percent by weight, preferably from about 5 to 75 percent by weight, and more preferably from about 10 to 50 percent by weight, based on the weight of the composition, i.e., the weight of the organopolysiloxane, the organohydrogenpolysiloxane, the platinum catalyst, the hydrazone compound and the filler.

Other additives which may be incorporated in the compositions of this invention include pigments, compression set additives, oxidation inhibitors, plasticizers, adhesion promoters, base stabilizers and other materials commonly employed as additives in the silicone rubber art. Such additives are preferably present in an amount below about 15 percent by weight based on the weight of the composition.

The compositions of this invention are mixed in any desired order. For example, the organopolysiloxane containing aliphatic unsaturation may be mixed with the organohydrogenpolysiloxane in the desired proportions and the desired amount of catalyst and hydrazone compound then added. A preferred method of mixing is to premix the organopolysiloxane having aliphatic unsaturation with the platinum catalyst and the hydrazone compound and then combine the resultant mixture with the organohydrogenpolysiloxane.

The compositions of this invention may be prepared by mixing the components on a roller mill, a kneader or a Banbury mixer.

In another embodiment, the platinum catalyst and the hydrazone compound are reacted together and the resultant product is then incorporated into the organopolysiloxane having aliphatic unsaturation and then mixed with the organohydrogenpolysiloxane, or it may be combined with the mixture containing the organopolysiloxane having aliphatic unsaturation and the organohydrogenpolysiloxane. When the platinum compound and the hydrazone compound are reacted together, generally a lesser amount of hydrazone is required in order to inhibit the catalytic activity of the platinum catalyst.

The relative amounts of the Si-bonded hydrogen containing compound and the compound containing aliphatic unsaturation can vary within extremely wide limits. Theoretically, one Si-bonded hydrogen atom is equivalent to one olefinic double bond. For many purposes, however, it may be desirable to employ an excess of one of the reactants to facilitate the completion of the reaction or to insure that the reaction product still contains either unreacted Si-bonded hydrogen atoms or aliphatically unsaturated groups.

With sufficient hydrazone compound, the curing system is stable; that is, it inhibits curing at room temperature. Generally, these compositions are heated to temperatures in the range of from about 50 to 300° C. and more preferably to a temperature of from 100° to 175° C. for curing. The cure time depends on such things as the reactants employed and the amount and type of catalyst employed.

In some cases, it is desirable to employ a diluent for the catalyst and/or one or both reactants. The diluent should be inert to the reactants and catalyst under the reaction conditions. Examples of suitable diluents are organopolysiloxanes such as trimethylsiloxy-terminated dimethylpolysiloxanes and organic solvents which vaporize at low temperatures. Examples of suitable organic solvents are chlorinated hydrocarbons such as trichloroethylene. When organic solvents are employed, they are preferably employed in an amount of less than 20 percent by weight based on the weight of the organopolysiloxane composition.

The addition of the Si-bonded hydrogen atoms to the aliphatically unsaturated groups may be inhibited or at least controlled by the addition of other inhibitors to the composition. Various compounds which may be used in combination with the hydrazone compound to inhibit platinum catalyzed addition reactions are benzotriazole; acetylenic compounds such as acetylenically unsaturated secondary or tertiary alcohols and siloxanes such as 1,3-divinyl-1,1,3,3-tetramethyl-disiloxane. Other compounds which may be employed are tetramethylquanidine acetate, ethylenically unsaturated isocyanurate, phenylhydrazine, a diaziridine, dithiocarbamic acids, thiuram monosulfides, 2-mercaptobenzothiazole and the like.

The amount of inhibitor used in addition to the hydrazone compound may be varied depending on such characteristics as the type and amount of platinum catalyst used, the degree of inhibition desired to be imparted to the platinum catalyst and often the type of unsaturated polysiloxane and hydrogenpolysiloxane employed. Generally, the amount of inhibitor employed can range from about 0.001 to about 6 percent by weight and more preferably from about 0.01 to about 5 percent by weight based on the weight of the composition.

The compositions of this invention can be used for any application where heat curing is possible. These compositions are especially useful as coating compositions and as encapsulating materials for semiconductors. In addition, these compositions may be used as adhesive repellent coatings and as fabric coatings. Also, these compositions may be molded by injection molding.

The heat curable organopolysiloxane compositions of this invention have excellent storage stability at room temperature. In addition, the curing system of this invention can serve to control the rate of curing of a platinum catalyzed curing system.

Preparation of platinum catalyst (a) The platinum catalyst is prepared by drying chloroplatinic acid in an oven at a temperature of from 100° to 150° C. for 2 hours and then dissolving 10 parts of the dried chloroplatinic acid in 190 parts of ethanol.

(b) A platinum catalyst is prepared by adding 1.6 parts of chloroplatinic acid ($H_2PtCl_6.H_2O$) to 50 parts of isopropanol with agitation.

(c) A platinum-styrene complex is prepared in accordance with U.S. Pat. No. 4,394,317 to McAfee et al in which 12 parts of sodium bicarbonate are added to a mixture containing 6 parts of chloroplatinic acid ($H_2PtCl_6.6H_2O$), 12 parts of styrene and 100 parts of ethanol. The mixture is heated to reflux temperature (about 55° C.) and refluxed for about 35 minutes with agitation and then cooled to room temperature. The resultant mixture is filtered and the crystals washed with about 60 parts of acetone.

Preparation of hydrazone solution (d) A hydrazone solution is prepared by dissolving about 20 parts of a diphenylcarbylhydrazone having the formula

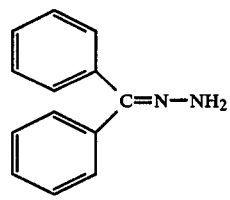

in 380 parts of benzene.

(e) A hydrazone solution is prepared by dissolving 6.4 parts of diphenylcarbylhydrazone in 50 parts of xylene.

Preparation of platinum-hydrazone complex (f) A platinum-hydrazone complex is prepared by adding 16 parts of diphenylcarbylhydrazone to a solution containing 100 parts of xylene and 40 parts of isopropanol. To the resultant solution is added 4 parts of chloroplatinic acid ($H_2PtCl_6.6H_2O$) and the resultant mixture stirred for 5 hours at room temperature.

(g) A platinum-styrene-hydrazone complex is prepared by adding 200 parts of a platinum styrene complex prepared in accordance with the procedure described in Example (c) above to a hydrazone solution containing 13 parts of diphenylcarbylhydrazone, 30 parts of isopropanol and 60 parts of xylene with agitation. An opaque tan colored solution is obtained containing about 430 ppm of platinum.

Preparation of platinum-hydrazone-organopolysiloxane catalyst composition (h) A platinum-hydrazone-organopolysiloxane catalyst composition is prepared by adding 4 parts of a hydrazone solution containing 2 parts of diphenylcarbylhydrazone in 38 parts of methylene chloride to a vinyl-terminated dimethylpolysiloxane having a viscosity of 15000 mPa.s at 25° C. with agitation. Then about 2.5 parts of a platinum solution containing 1.76 parts of chloroplatinic acid in 37.4 parts of ethanol are added to the resultant mixture and agitated for 1.5 hours at room temperature. The resultant catalyst composition contains 100 ppm of platinum.

EXAMPLE 1

About 1 part of the hydrazone solution prepared in Example (d) above is mixed with 500 parts of a vinyl-terminated dimethylpolysiloxane fluid having a viscosity of about 60,000 mPa.s at 25° C. A clear, colorless mixture is obtained. About 0.5 parts of the platinum solution prepared in (a) above are then added to the mixture and mixed for about 4 hours at room temperature. A pale, yellow translucent mixture is obtained.

To the above mixture is added 20 parts of a methylhydrogenpolysiloxane fluid having a viscosity of 50 mPa.s at 25° C. and about 0.23 weight percent of silicon-bonded hydrogen and mixed for about 10 minutes. A portion of this mixture is placed in an air dry oven maintained at 125° C. Gelation is observed after about 5 minutes and the sample is tack-free after about 20 minutes.

Another portion of the mixture is stored in a closed container for one month at room temperature. The viscosity increased by about 2 percent; however, the mixture exhibits the same cure rate.

EXAMPLE 2

About 350 parts of a vinyl-terminated dimethylpolysiloxane fluid having a viscosity of about 15,000 mPa.s at 25° C. is mixed with about 150 parts of a treated fumed silica filler, then about 300 parts of a vinyl-terminated dimethylpolysiloxane fluid, having a viscosity of 15,000 mPa.s at 25° C., and 215 parts of a diatomaceous earth filler are added to the mixture and mixed for about 10 minutes at room temperature. About 0.82 parts of the hydrazone solution, prepared in (d) above are added and mixed for about 15 minutes. About 0.47 parts of the platinum solution prepared in (a) above are added to the mixture and mixed for about 50 minutes. To about 150 parts of this mixture are added 3 parts of a methylhydrogenpolysiloxane fluid having a viscosity of 50 mPa.s at 25° C. and containing 1.0 weight percent of silicon-bonded hydrogen and 0.04 weight percent vinyl. The resultant mixture has a shear viscosity of 450,000 mPa.s at 25° C. A sample of this mixture is placed in an air oven at 125° C. and after about 5 minutes it becomes a tacky elastomer and after about 20 minutes, it becomes tack-free. The durometer (Shore A) of the cured material is 42 to 44. After storing for 3 weeks at room temperature in a closed container, the composition exhibits the same cure rate, while the shear viscosity increased about 5 percent.

EXAMPLE 3

About 5 parts of the hydrazone solution prepared in (d) above are added to 500 parts of a vinyl-terminated dimethylpolysiloxane fluid having a viscosity of 1000 mPa.s at 25° C. and stirred for about 10 minutes. A clear, colorless mixture is obtained. About 0.6 parts of the platinum solution prepared in (a) above are added to the mixture and mixed for about 4 hours at room temperature. A pale, yellow translucent mixture is obtained. About 15 parts of a methylhydrogenpolysiloxane fluid having a viscosity of 50 mPa.s at 25° C. and containing 1.0 weight percent of silicon-bonded hydrogen and 0.04 weight percent vinyl are added to the mixture and mixed for 10 minutes. To about 90 parts of this composition are added 47 parts of zinc oxide. A sample of this material is placed in an air oven at 125° C. A tack-free rubber is obtained in about 15 minutes. After storing for one month at room temperature, in a closed container, the composition exhibits the same cure profile, and no viscosity change is observed.

EXAMPLE 4

About 0.45 parts of the hydrazone solution prepared in (d) above are added to 800 parts of a vinyl-terminated dimethylpolysiloxane fluid having a viscosity of 1000 mPa.s at 25° C. and mixed for about 10 minutes. About 0.73 parts of the platinum solution prepared in (a) above are added to the mixture and mixed for one hour at room temperature. A pale, yellow translucent mixture is obtained. To about 75 parts of this mixture are added about 75 parts of a vinyl-terminated dimethylpolysiloxane fluid having a viscosity of 1000 mPa.s at 25° C. and 15 parts of a methylhydrogenpolysiloxane fluid containing 1.0 weight percent of silicon-bonded hydrogen and 0.04 weight percent vinyl. A sample of the resultant composition is placed in an oven at 125° C. A tack-free rubber is obtained in about 20 minutes. After storing for 4 days at room temperature in a closed container, the mixture exhibits the same cure rate and viscosity.

EXAMPLE 5

(A) About 5.64 parts of the hydrazone solution prepared in (e) above are mixed with 30 parts of a vinyl-terminated polydimethylsiloxane having a viscosity of 15,000 mPa.s at 25° C.; then 5.16 parts of the platinum solution prepared in (b) above are added to the mixture and mixed for 30 minutes at room temperature. A yellow, opaque catalyst mixture is obtained.

(B) In a separate mixer, 58 parts of a vinyl-terminated polydimethylsiloxane having a viscosity of 60 mPa.s at 25° C. are mixed with 2.4 parts of a methylhydrogenpolysiloxane fluid containing 0.23 weight percent of silicon-bonded hydrogen and 0.88 parts of the yellow catalyst mixture prepared in Example 5(A) above. The extrusion rate of the resultant composition is the same after being stored for two weeks at room temperature in a closed container, and exhibits the same cure rate as the freshly prepared composition.

EXAMPLE 6

(A) About 15 parts of the platinum-hydrazone complex prepared in (f) above are mixed with 135 parts of a vinylterminated polydimethylsiloxane having a viscosity of 1000 mPa.s at 25° C. to form a catalyst mixture.

(B) To about 294 parts of a vinyl-terminated polydimethylsiloxane having a viscosity of 60,000 mPa.s at 25° C. are added 87 parts of diatomaceous earth filler, 254 parts of a vinyl-terminated polydimethylsiloxane fluid containing 30 percent by weight of treated fumed silica, 12.7 parts of methylhydrogenpolysiloxane fluid containing 1.0 weight percent of silicon-bonded hydrogen and 0.04 weight percent vinyl and 8.6 parts of the catalyst mixture prepared in Example 6(A) above and mixed for 2 hours. The resultant composition exhibits no viscosity drift after storing for 4 days at room temperature in a closed container. A sample of the resultant mixture is heated 4 minutes at 175° C. to form an elastomer having a tensile strength of 630 psi and a Shore A durometer of 40.

EXAMPLE 7

About 6.5 parts of the platinum-hydrazone complex prepared in (g) above are mixed with 175 parts of a vinylterminated polydimethylsiloxane having a viscosity of 1000 mPa.s at 25° C. and 7.5 parts of a methylhydrogenpolysiloxane containing 0.23 weight percent of silicon-bonded hydrogen and having a viscosity of 50 mPa.s at 25° C. After storing for 4 days at room temperature in a closed container, the viscosity increased from 1050 mPa.s to 5500 mPa.s at 25° C.

COMPARISON EXAMPLE V₁

The procedure of Example 7 is repeated, except that 2.8 parts of a platinum catalyst prepared in accordance with (c) above are substituted for the platinum-hydrazone complex prepared in (g) above. The resultant composition gelled within 30 minutes.

EXAMPLE 8

To about 135 parts of a vinyl-terminated polydimethylsiloxane fluid having a viscosity of 15,000 mPa.s at 25° C. are added 3 parts of a methylhydrogenpolysiloxane fluid having a viscosity of 50 mPa.s at 25° C. and containing 1.0 weight percent of silicon-bonded hydrogen and 0.04 weight percent vinyl and 15 parts of the platinum-hydrazone-organopolysiloxane catalyst composition prepared in (h) above and mixed for about one hour at room temperature. A sample of the resultant material is placed in an air dry oven at 130° C. and after 20 minutes the sample changed to a nonflowing gel. After storing for 2 weeks at room temperature in a closed container the viscosity increased slightly.

COMPARISON EXAMPLE V₂

The procedure of Example 8 is repeated, except that 15 parts of a catalyst composition containing 500 parts of a vinyl-terminated polydimethylsiloxane having a viscosity of 15000 mPa.s at 25° C., 4 parts of a benzotriazole solution containing 1.2 parts of benzotriazole and 38.8 methylene chloride and 2.5 parts of a platinum solution containing 1.76 parts of chloroplatinic acid and 37.4 parts of ethanol are substituted for the platinum-hydrazone organopolysiloxane catalyst composition prepared in accordance with (h) above. When a sample of the resultant composition is placed in an air dry oven at 130° C. for 30 minutes, no curing is observed. After 2 weeks of storage in a closed container at 25° C., the viscosity increased less than 5 percent of the initial measurement.

EXAMPLE 9

The procedure of Example 1 is repeated, except that 1 part of a hydrazone solution prepared by dissolving 7 parts of acetone hydrazone in 393 parts of benzene are substituted for the hydrazone prepared in (d) above. Essentially, the same results are obtained as in Example 1.

EXAMPLE 10

The procedure of Example 1 is repeated, except that 1 part of a hydrazone solution prepared by dissolving 25 parts of benzaldehyde phenylpropylhydrazone in 375 parts of benzene are substituted for the hydrazone prepared in (d) above. Essentially the same results are obtained as in Example 1.

EXAMPLE 11

The procedure of Example 1 is repeated, except that 1 part of a hydrazone solution prepared by dissolving 14 parts of acetaldehyde phenylhydrazone in 386 parts of benzene are substituted for the hydrazone prepared in (d) above. Essentially the same results are obtained as in Example 1.

What is claimed is:

1. A heat curable organopolysiloxane composition comprising (a) an organopolysiloxane having an average of at least two aliphatically unsaturated hydrocarbon radicals per molecule, (b) an organohydrogenpolysiloxane having an average of at least two Si-bonded hydrogen atoms per molecule, (c) a platinum catalyst capable of promoting the addition of the Si-bonded hydrogen atoms to the aliphatically unsaturated hydrocarbon radicals and (d) a hydrazone compound.

2. The composition of claim 1, wherein the hydrazone compound has the formula

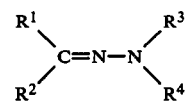

where $R^1$, $R^2$, $R^3$ and $R^4$ is selected from the group consisting of hydrogen and a monovalent hydrocarbon radical having from 1 to 6 carbon atoms, with the proviso that $R^1$ or $R^2$ must be a monovalent hydrocarbon radical.

3. The composition of claim 1, wherein the hydrazone compound is present in an amount of from 1 to 150 moles per mole of platinum.

4. The composition of claim 1, wherein the platinum catalyst is mixed with the hydrazone compound before it is combined with the organopolysiloxane (a) and organohydrogenpolysiloxane (b).

5. The composition of claim 1, wherein the organopolysiloxane (a) contains recurring units of the formula $$R_xSiO_{\frac{4-x}{2}},$$

where R is selected from the group consisting of monovalent hydrocarbon radicals and halogenated monovalent hydrocarbon radicals having from 1 to 18 carbon atoms, in which an average of at least two of the monovalent hydrocarbon radicals contain aliphatic unsaturation per molecule and x is an integer of from 1 to 3, with an average value of from about 1.7 to about 2.1.

6. The composition of claim 5, wherein the organopolysiloxane (a) has a viscosity of from 5 to 10,000,000 mPa.s at 25° C.

7. The composition of claim 1, wherein the organohydrogenpolysiloxane (b) has the formula

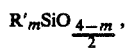

where R' is selected from the group consisting of hydrogen, a monovalent hydrocarbon radical and a halogenated monovalent hydrocarbon radical, in which an average of at least two Si-bonded hydrogen atoms are present per molecule and m is 1, 2 or 3.

8. The composition of claim 7, wherein the organohydrogenpolysiloxane has a viscosity of from 10 to 50,000 mPa.s at 25° C.

9. The composition of claim 1, wherein the organopolysiloxane composition contains filler.

10. A process for preparing a heat curable organopolysiloxane composition which comprises mixing (a) an organopolysiloxane having an average of at least two aliphatically unsaturated hydrocarbon radicals per molecule with (b) an organohydrogenpolysiloxane having an average of at least two Si-bonded hydrogen atoms per molecule and (c) a catalyst composition containing a platinum catalyst and a hydrazone compound.

11. The process of claim 10, wherein the hydrazone compound has the formula

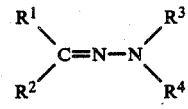

where $R^1$, $R^2$, $R^3$ and $R^4$ is selected from the group consisting of hydrogen and a monovalent hydrocarbon radical having from 1 to 6 carbon atoms, with the proviso that $R^1$ or $R^2$ must be a monovalent hydrocarbon radical.

12. The process of claim 10, wherein the hydrazone compound is present in an amount of from 1 to 150 moles per mole of platinum.

13. The process of claim 10, wherein the platinum catalyst is prereacted with the hydrazone compound and then combined with organopolysiloxane (a) and organohydrogenpolysiloxane (b).

14. The process of claim 10, wherein the composition is heated to an elevated temperature to promote crosslinking.

15. The process of claim 14, wherein the composition is heated to a temperature sufficient to activate the platinum catalyst.

16. The process of claim 14, wherein the composition is heated to a temperature above 50° C. to promote crosslinking.

17. The composition prepared in accordance with the process of claim 10.

* * * * *